Patented Dec. 1, 1925.

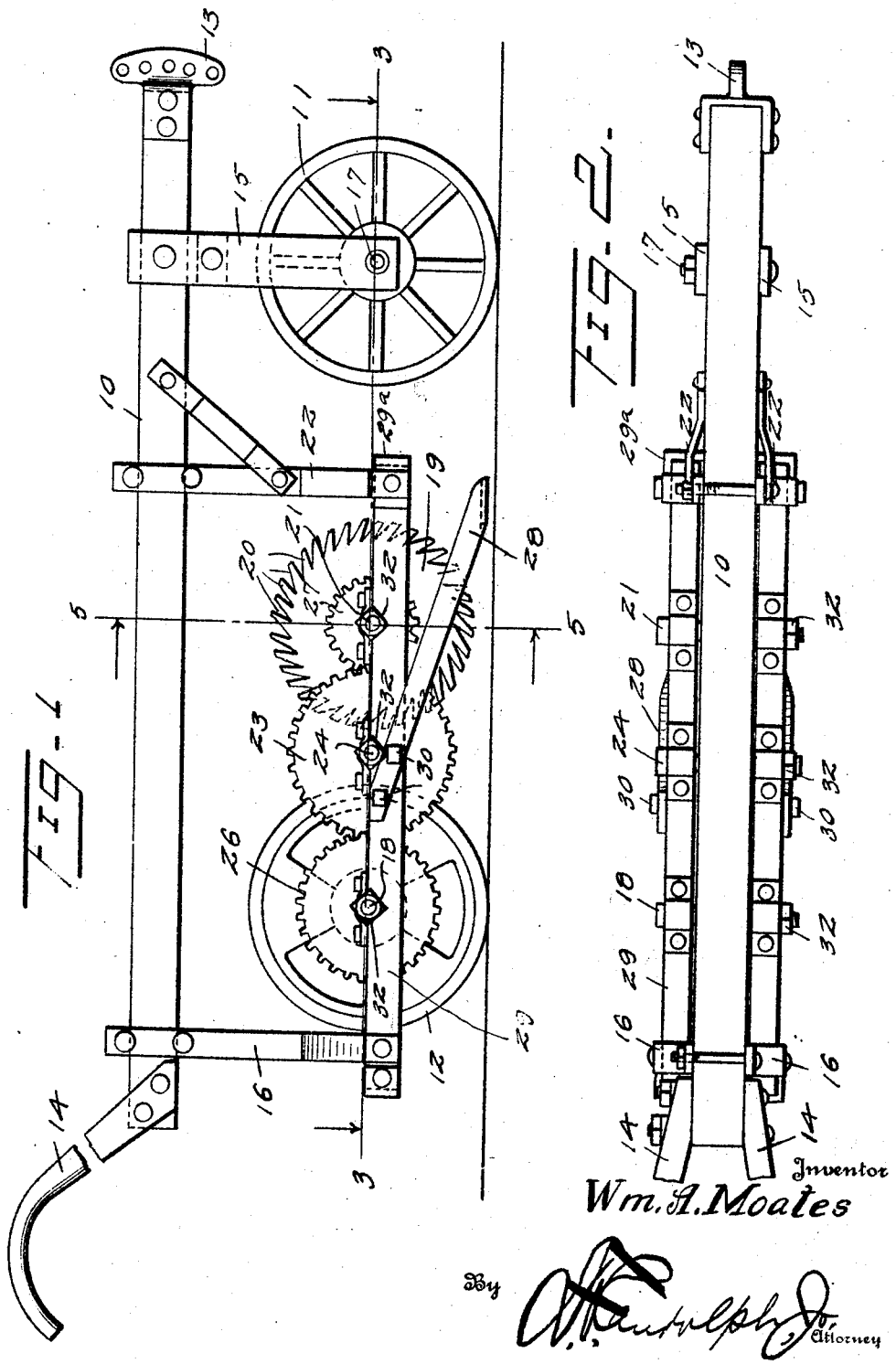

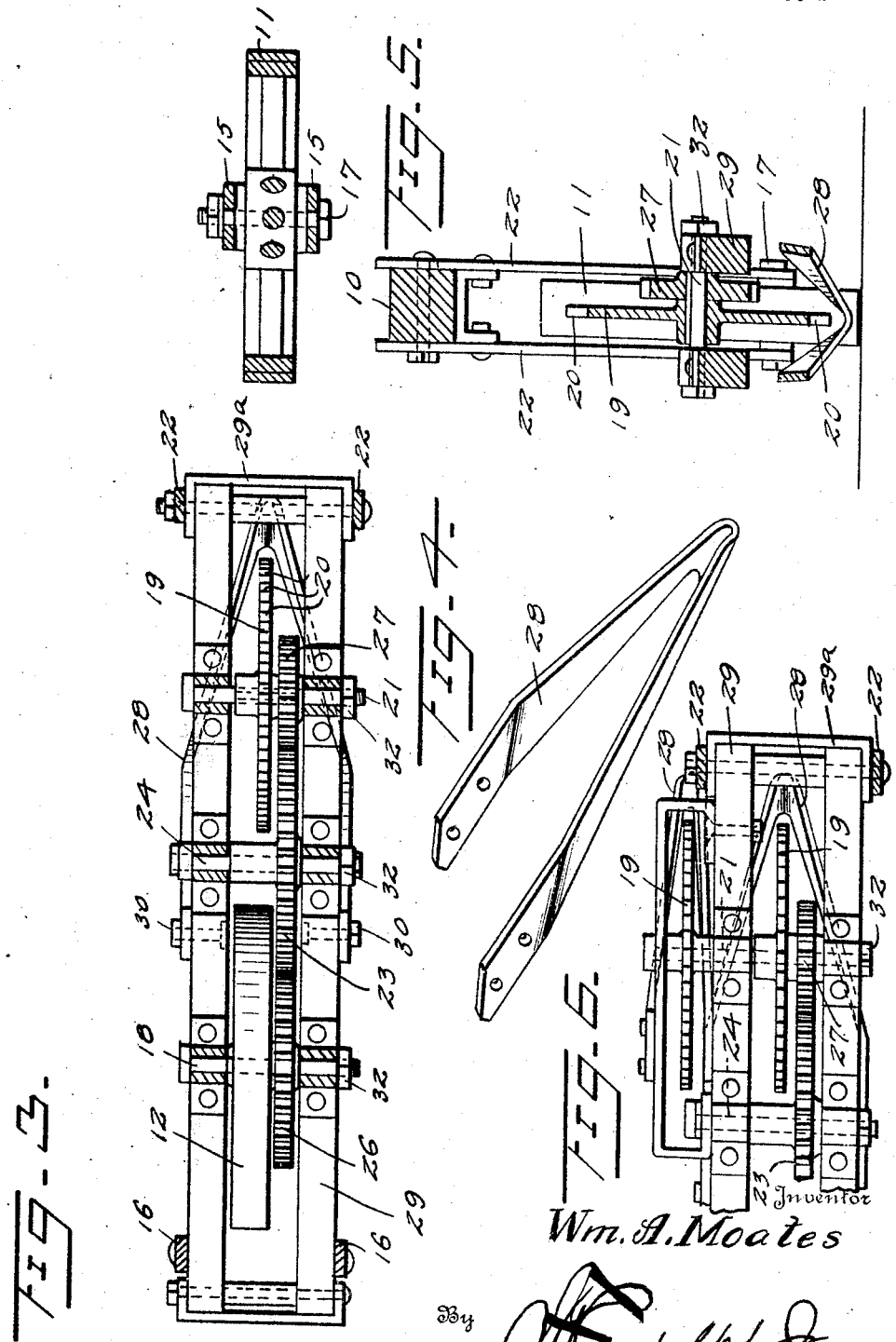

1,564,094

UNITED STATES PATENT OFFICE.

WILLIAM A. MOATES, OF JASPER, FLORIDA.

VINE CLIPPER OR CUTTER.

Application filed April 4, 1925. Serial No. 20,709.

*To all whom it may concern:*

Be it known that I, WILLIAM A. MOATES, a citizen of the United States, residing at Jasper, in the county of Hamilton and State of Florida, have invented certain new and useful Improvements in Vine Clippers or Cutters; and I do hereby declare the following to be a full, clear, and exact description of the invention, such as will enable others skilled in the art to which it appertains to make and use the same.

This invention relates to a vine clipper or cutter particularly designed to cut sweet potato vines.

It is aimed to provide a novel construction wherein the operating power is derived through travel of a ground wheel.

Various specific objects and advantages will become apparent from a consideration of the description following taken in connection with accompanying drawings illustrating an operative embodiment.

In said drawings:—

Figure 1 is a view of the apparatus in side elevation;

Figure 2 is a plan view;

Figure 3 is a longitudinal sectional view taken on the line 3—3 of Figure 1;

Figure 4 is a perspective view of the vine lifter and cutter guide;

Figure 5 is a transverse sectional view taken on the line 5—5 of Figure 1, and

Figure 6 is a fragmentary plan view illustrating the cutter and associated parts.

Referring specifically to the drawings, a beam is provided as at 10 which may be of wood, or otherwise and associated with a front ground wheel 11 and a rear ground wheel 12, preferably similar in size. The beam 10 may be drawn by horses or otherwise connected to the hitching means at the forward end thereof as at 13 and may be guided by a suitable handle construction 14 at the rear end. U-shaped hangers 15, 16 and 22 straddle the beam 10 and are fastened thereto. The hanger 15 mounts the axle 17 on which is journaled the wheel 11, while the hangers 16 and 22 support the cutting frame comprising the parallel beam 29.

The rear ground wheel 12 is carried by an axle 18 journaled on the parallel beams 29. 29ª indicates U-shaped members connecting the forward and rear ends of parallel beams 29 and serve to rigidify the structure. A cutter wheel for vines is shown at 19, being preferably of the disk type and having cutting teeth 20 on its periphery. The cutting disk 19 is journaled on parallel beams 29 by means of axle or shaft 21. 23 indicates an intermediate gear journaled on parallel beams 29 by means of axle or shaft 24 and intermeshes with gear wheel 26 rigid with and turnable with ground wheel 12, and gear wheel 27 concentric with the axis of cutter 19 and rigid therewith.

A vine lifting or elevating element is designated at 28 and is bifurcated as shown and has its two arms secured to the parallel beams 29, as at 30. The lifting or elevating element 28 has its two arms disposed on opposite sides of the cutter disk 19 and has its forward and downwardly inclined front end arranged forwardly of and below the periphery of the disk 19 and slightly above the ground as clearly shown in Figure 1. This arrangement it will be understood provides for lifting the vines and other matter to be cut by the cutting disk 19 into a position to be engaged thereby.

In operation as the apparatus is drawn forwardly by animal or other power hitched thereto at 13, the same will be guided by an attendant or operator who walks and holds the handles 14 so as to guide the device. The wheels 11 and 12 rotate through traction with the ground and accordingly gear wheel 26 is driven which in turn drives gear wheel 23 and gear wheel 27 and finally the cutter 19. Thus vines or the like which are engaged by the element 28 are elevated thereby and will be engaged and cut by the teeth 20 of cutter 19.

It will be understood that the various wheels are fastened removably on their shafts and the shafts fastened removably in the hangers as by nuts 32 on the said shafts, particularly allowing of substitution or replacement of the parts and for removal of the cutter for sharpening.

Various changes may be resorted to provided they fall within the spirit and scope of the invention.

I claim as my invention:—

1. A device of the class described having a beam, a frame below and supported from said beam, said frame being centered with respect to the beam, a ground wheel at the front of the beam, a second ground wheel, an axle carrying the second ground wheel and journaled on said frame, a gear member turnable with said wheel and axle, a cutter adjacent the forward end of the frame, a shaft journaling said cutter on said frame, means to drive the cutter shaft from said gear, and a U-shaped lifting element fastened to said frame and in the bifurcation of which the cutting member is disposed.

2. A machine of the class described comprising a beam, a frame suspended from said beam and centered with respect thereto, a ground wheel supported at the front of the beam, a rear ground wheel journaled on said frame, a gear wheel on the rear ground wheel and turnable therewith, an intermediate gear in mesh with the first mentioned gear wheel and journaled on said frame, a cutter journaled on said frame, a gear wheel turnable with said cutter and in mesh with the intermediate gear wheel, and a forwardly and downwardly inclined lifting element fastened to said frame, said lifting element being U-shaped and receiving the cutter between its arms and having its forward end in advance of the cutter.

In testimony whereof I affix my signature.

WILLIAM A. MOATES.